A. VAN GOFRE.
STABILIZER.
APPLICATION FILED OCT. 7, 1915.
1,203,081. Patented Oct. 31, 1916.
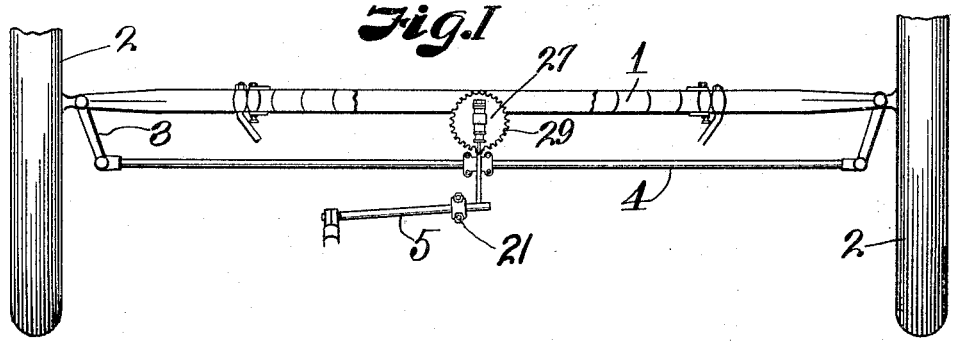
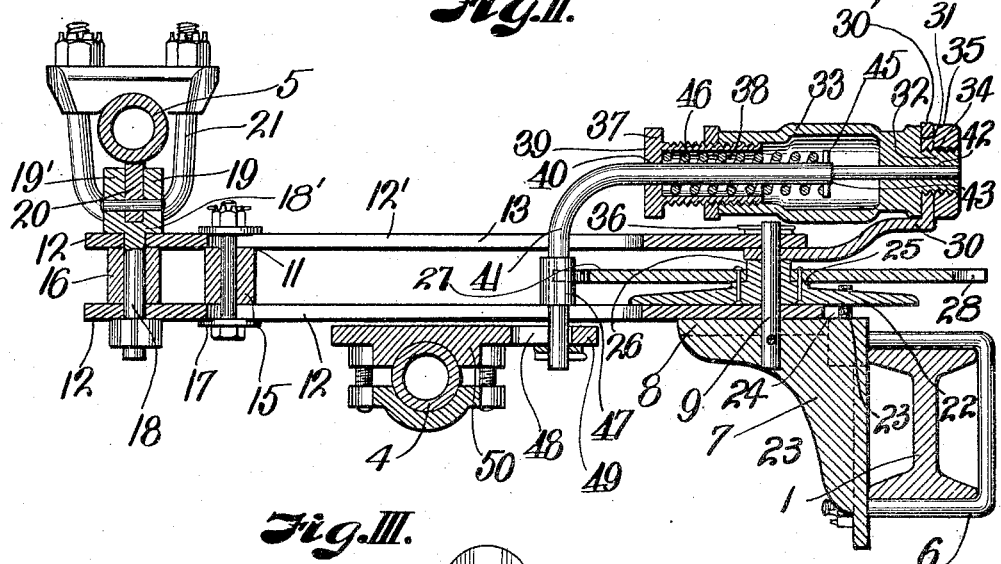
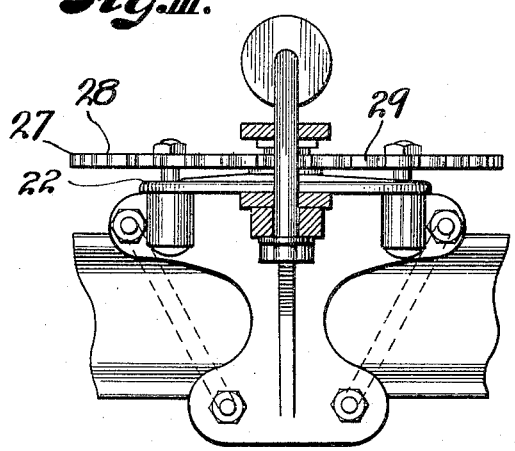
INVENTOR
Anton Van Gofre.
BY
Arthur C. Brown,
ATTORNEY

UNITED STATES PATENT OFFICE.

ANTON VAN GOFRE, OF KANSAS CITY, MISSOURI, ASSIGNOR OF ONE-HALF TO CHARLES J. GREENE, OF KANSAS CITY, MISSOURI.

STABILIZER.

1,203,081.     Specification of Letters Patent.     Patented Oct. 31, 1916.

Application filed October 7, 1915. Serial No. 54,674.

*To all whom it may concern:*

Be it known that I, ANTON VAN GOFRE, a citizen of the Netherlands, residing at Kansas City, in the county of Jackson, and State of Missouri, have invented certain new and useful Improvements in Stabilizers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to a stabilizer for the steering mechanism of a motor driven vehicle, and has for its principal object to provide means for holding the steering parts yieldingly in any desired line of travel without requiring the constant attention of a driver to the steering mechanism. In accomplishing this object I have provided improved details of structure, the preferred forms of which are illustrated in the accompanying drawing, wherein:—

Figure I is a plan view of the front axle of a motor driven vehicle, showing the ground wheels and an ordinary type of knuckle steering mechanism equipped with my improvement. Fig. II is an enlarged vertical section of the stabilizer and its connected parts. Fig. III is a front view of the same.

Referring more in detail to the drawings:—1 designates a front axle, 2 the ground wheels, 3 the steering knuckle, 4 a connecting rod and 5 the thrust rod, of a motor vehicle of any ordinary type, such parts being of the usual construction and in themselves forming no part of the present invention. Fixed on the axle 1, preferably by means of a U-clamp 6, is a bracket 7, having a top plate 8, and fixed to and projecting above the top plate is a vertical axle 9. Pivotally mounted on the axle 9, and supported by the bracket 7, is a guide member 11, comprising the spaced arms 12—12', the former of which rests on the bracket 7, while the latter is spaced from the former by parts hereinafter described, both arms being provided with the longitudinal slots 13, which extend throughout a substantial part of the length of the arm, the spacing of the arms at their outer ends being preferably accomplished by sleeves 15—16 that are held in place by a bolt 17 and bolt shank 18 respectively; the shank 18 having a head 18' comprising the spaced ears 19—19' between which is pivotally mounted a bar 20, which is connected by means of a U-clamp 21, to the thrust rod 5, so that a lateral movement of the rod 5 gives a like movement to the arms 12—12'.

Seated on the lower guide arm 12 is a base plate 22, which is anchored to the bracket 7 by a set screw 23 that projects through the plate into the socket 24 in the bracket in order to hold the plate immovable, and fixed on a seat 25 on said plate, about a shank 26 that rises centrally therefrom, is a ratchet disk 27 having the peripheral teeth 28 forming sockets 29.

Pivotally mounted on the axle 9 above and resting on the top of shank 26 is a bracket 30 having a head 30' arranged vertically and provided with a central, screw-threaded aperture 31, and threaded into said aperture and projecting rearwardly therefrom is the shank 32 of a barrel 33, the said shank being provided with a screw thread 34 for carrying a nut 35 whereby the barrel is held to the bracket arm.

The upper arm 12' of the guide member 11 rests on the top of the bracket 30, and all of the parts that are carried by the axle 9 are held in place by a cotter pin 36, which extends through the top of the axle above the top guide arm 12'. Threaded into the outer end of the barrel 33 is a plug 37, having an inwardly opening chamber 38, and having an outer head 39, whereby the plug may be manipulated to vary the tension of a spring (hereinafter described) that forms the yielding member of the stabilizer.

Slidably mounted in an aperture 40, in the head 39 of the barrel plug 37 is a rod 41; the inner end of which is also slidably mounted in a channel 42 in the barrel shank 29 and is reduced in diameter near its rear end to form a shoulder 43 that may abut against the base of the barrel to limit the projection of the rod; the said rod being provided with a stop pin 45 for holding the inner end of the spring 46 that is coiled about the rod, with its outer end bearing against the face of the head 39 of the plug 37, the spring being of the expansion type, so that the rod is yieldingly urged to the rear end of the barrel. The outer end of the rod is turned downwardly and extended through the slots 13 in the guide arms 12—12', and carries an anti-friction roller 47 which engages the periphery of the ratchet disk 27 and is adapted to seat in the sockets 29 thereof, the spring 46 urging the roller to its seat in the sockets. The rod 41 projects beyond the roller 47 and beneath the guide arms 12—12' and into a slot 48, in the arm 49 of a bracket 50, that is fixed to the connecting rod 4 of the knuckle steering mechanism, so that when the arms 12—12' are moved laterally by the movement of the thrust rod 5, they engage the rod 41 to move the latter against the guide members 12—12' to move the connecting rod 4 laterally and thereby actuate the steering knuckles; the rod 41 turning about the ratchet wheel 27 during such movement. As the rod 41 is held toward the ratchet wheel by the spring 38, the spring must yield to allow the roller 47 to pass over the teeth of the wheel and will reseat the roller successively in the successive sockets, so that when the rod has reached its full movement it and the parts connected with it will be held in place and the steering mechanism stabilized and the driver relieved of the constant, close attention he would otherwise be required to give to the steering operation.

It is apparent that by mounting the rod 41 in the slotted arms of the bracket 50 and guide arms 12—12' the rod may turn about the ratchet wheel and have longitudinal movement in the arms, and also that the rigidity of the stabilizer may be varied by regulation of the spring through manipulation of the screw plug 37.

Having thus described my invention, what I claim as new therein, and desire to secure by Letters-Patent, is:—

1. The combination in a vehicle comprising an axle, of steering mechanism comprising a connecting rod, a disk fixed to the axle and having peripheral sockets, a barrel pivotally mounted on the vehicle concentrically with the disk, slotted arms pivotally mounted on the vehicle and having connection with the connecting rod, a rod slidably mounted in said barrel and having a portion projected through the slots in said slotted arms, and yielding means for urging the said rod to seat in the sockets in said disk.

2. The combination in a vehicle comprising an axle, of steering mechanism, a disk fixed on the axle and having peripheral sockets, slotted arms pivotally mounted on the axle and connected with the steering mechanism, a barrel pivotally mounted on the axle, a rod slidably mounted in said barrel and having a free end projected through the slots in said slotted arms and adapted for seating in the socket in said disk, and a spring in said barrel acting on said rod, to urge the same to seat in the disk sockets.

3. The combination in a vehicle comprising an axle, of steering mechanism, a disk fixed on the axle and having peripheral sockets, a slotted arm pivotally mounted on the axle, and connected with the steering mechanism, a bracket pivotally mounted on the axle, a barrel fixed to said bracket, a rod slidably mounted in the barrel and having a free end slidably mounted in the slot in said slotted arm and adapted for seating in the disk sockets, and a spring in said barrel engaging the barrel and rod to urge said rod in a direction to seat the same in the disk sockets.

4. The combination in a vehicle comprising an axle, of steering mechanism, a disk fixed on the axle and having peripheral sockets, a slotted arm pivotally mounted on the axle and connected with the steering mechanism, a bracket pivotally mounted on the axle, a barrel fixed to said socket and comprising an adjustable plug, a rod slidably mounted in the barrel and having a free end slidably mounted in the slots in said slotted arm and adapted for seating in the disk sockets, and a spring in said barrel engaging the plug and rod to urge said rod in a direction to seat the same in the disk sockets, said rod having a shoulder adapted for engaging the base of the barrel to limit the projection of the rod.

5. The combination in a vehicle comprising an axle, of steering mechanism, a disk fixed on the axle and having peripheral sockets, a slotted arm pivotally mounted on the axle, and connected with the steering mechanism, a bracket pivotally mounted on the axle, a barrel fixed to said bracket, and having an adjustable plug, a rod slidably mounted in the barrel and having a free end slidably mounted in the slots in said slotted arm and adapted for seating in the disk sockets, and a spring in said barrel engaging the plug and rod to urge said rod in a direction to seat the same in the disk sockets, said rod having an anti-friction roller thereon in position for engaging said disk.

6. The combination in a vehicle comprising an axle, of steering mechanism, comprising connecting and thrust rods, a disk fixed to the axle and having peripheral sockets, an arm pivotally mounted on the axle and connected with the connecting and thrust rods, said arm having a longitudinal slot therein, a bracket pivotally mounted on said axle, a rod slidably mounted on said bracket, and having a free end projected through a slot in said slotted arm and adapted for seating in the sockets in said disk, and yielding means for urging the rod toward said disk.

7. The combination in a vehicle comprising an axle, of steering mechanism, a base member fixed to the axle and having a projecting shank, a disk fixed to the base about the shank, and having peripheral sockets, an arm pivotally mounted on said axle and having slots therein, means connecting the arm with the steering mechanism, a rod slidably mounted on said bracket and having a free end projected through the arm slots and adapted for engaging in the disk, and yielding means for urging the rod to engagement with the disk.

8. The combination in a vehicle comprising an axle, of steering mechanism, spaced arms pivotally mounted on the axle and connected with the steering mechanism and provided with longitudinal slots, a base mounted on said axle between said arms, and provided with a shank, means for fixing the said base to the axle, a disk fixed on said shank and having peripheral sockets, a bracket pivotally mounted on said axle, a barrel mounted on said bracket, a rod slidably mounted in the barrel and having a free end projected through the arm slot and adapted for seating in the disk sockets, and yielding means in said barrel acting on the rod to yieldingly seat the same.

In testimony whereof I affix my signature.

ANTON VAN GOFRE.

Copies of this patent may be obtained for five cents each, by addressing the "Commissioner of Patents, Washington, D. C."